F. J. WAGNER & J. G. CARNEY.
FLUID METER.
APPLICATION FILED JULY 30, 1917.
1,274,642.
Patented Aug. 6, 1918.
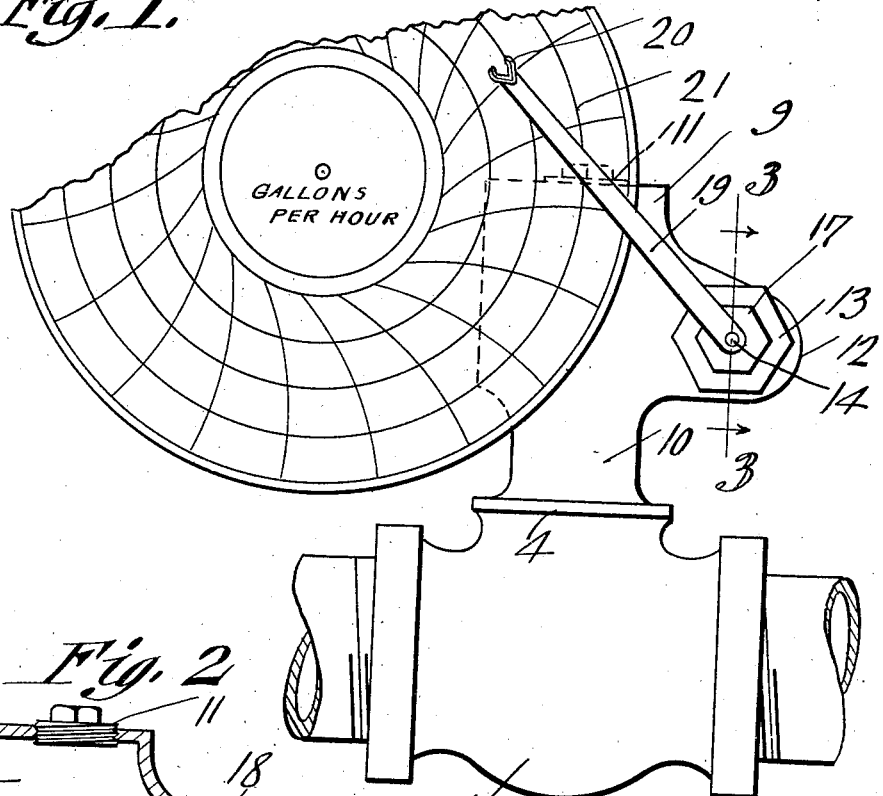
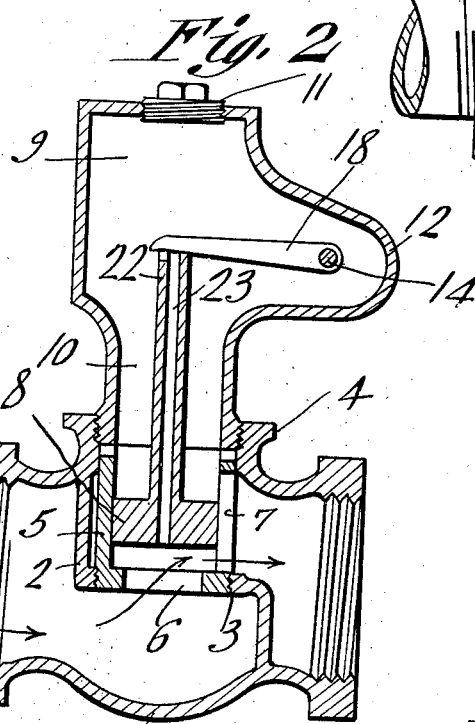
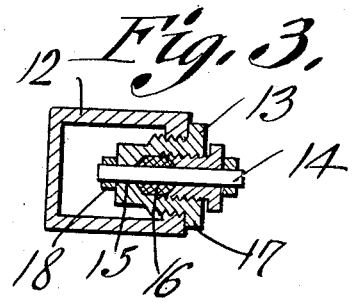
F. J. Wagner and J. G. Carney, Inventors

UNITED STATES PATENT OFFICE.

FRANK J. WAGNER AND JOHN G. CARNEY, OF ERIE, PENNSYLVANIA.

FLUID-METER.

1,274,642.

Specification of Letters Patent.

Patented Aug. 6, 1918.

Application filed July 30, 1917. Serial No. 183,505.

*To all whom it may concern:*

Be it known that we, FRANK J. WAGNER and JOHN G. CARNEY, citizens of the United States, residing at Erie, in the county of Erie, State of Pennsylvania, have invented a new and useful Fluid-Meter, of which the following is a specification.

The present invention appertains to meters, and is an improvement over the fluid meter disclosed in our Patent No. 1,187,607, granted June 20, 1916.

It is the object of the invention to provide a meter for indicating the volume and pressure of any fluid, either gas or liquid, flowing through a pipe in a simple yet accurate manner, the meter being of simple and inexpensive construction, but being, nevertheless, thoroughly efficient and reliable in operation.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Figure 1 is an elevation of the fluid meter.

Fig. 2 is a median section thereof.

Fig. 3 is a sectional detail on the line 3—3 of Fig. 1.

In carrying out the invention, there is provided a casing 1, which may be similar to the casing of a globe valve, and which is interposed in the fluid conducting pipe so that the fluid flows therethrough, the casing 1 having a partition 2 provided with an opening 3. Said casing has an upstanding boss 4 above the partition, and a plunger cup 5 is slipped downwardly through the opening of the boss 4 and its lower end is threaded within the opening 3 of the partition, the rim of the cup fitting within the boss, while the bottom thereof has a reduced opening 6 through which the fluid flows in the direction of the arrow. The wall of the cup 5 has a vertical slot 7 of suitable size and calibrated to suit the conditions. A plunger 8 is slidable vertically within the cup or guide 5, and is gravity operated to seat upon the bottom or flange of the cup over the opening 6 when there is no flow of fluid, said plunger being raised as the volume of flow is increased, and the amount that the plunger is raised is proportional to the volume of the flow of liquid, it being necessary for the fluid to raise the plunger before the fluid can flow from the opening 6 through the slot or opening 7 past the plunger. The slot 7 extends the full length of the plunger to avoid serious movement of the plunger to avoid serious fluctuations in the movement of said plunger.

The indicating device is operated by the plunger 8, and includes a casing 9 having a depending neck 10 threaded within the boss 4 and seating on the cup 5. The top of the casing 9 has a removable inspection plug 11, and one side of the casing has an outstanding extension or pocket 12 into the end of which a bushing 13 is threaded. A rock shaft 14 is journaled through said bushing, the bushing having an inwardly projecting extension 15 and a stuffing box 16 into which a gland 17 is threaded to prevent leakage of the fluid along the rock shaft, but permitting the rock shaft to turn freely. An arm 18 is secured to the inner end of the shaft 14 to work within the casing 9, and an arm 19 is secured to the outer end of said shaft and carries at its free end a suitable marking element 20 engaging a rotatable clock-driven chart 21 for indicating the gallons of flow per hour or other units of measurement, it being evident that as the chart 21 is rotated, the marking element 20 will mark a line thereon from which the amount of fluid per unit of time can be readily calculated.

The plunger 8 has an upstanding stem 22 upon the upper end of which the free end of the arm 18 bears by gravity, and the stem 22 and plunger or piston 8 are provided with a bore 23 extending therethrough for the passage of fluid past the plunger into the casing 9, whereby to equalize the pressures on the opposite sides of the plunger, in order that it will act by gravity only. It is evident that the fluid impinging against the plunger will flow therethrough by way of the bore 23, into the casing 9 and plunger cup 5, thereby equalizing the pressures thereon, even though the plunger 8 is seated over the opening 6. Thus, when the plunger 8 is seated over the opening, the flow of fluid in starting can pass through the bore 23 to equalize the pressures on the plunger, thus providing for a smoother and more accurate operation of the meter. It is evident that the greater the volume of flow of the fluid, the higher the plunger 8 will be raised, thus raising the arms 18 and 19 to move the marking element 20 accordingly. As the volume of the flow of fluid is decreased, the plunger 8 will fall by gravity, thus permitting the arms 18 and 19 to swing downwardly by gravity.

Having thus described the invention, what is claimed as new is:

1. A fluid meter embodying a plunger, a guide for the plunger having an opening for the flow of fluid against the plunger and another opening for the passage of fluid from the guide, there being a duct to admit fluid beyond the plunger to equalize the pressures on opposed sides of the plunger, and means operated by the plunger for indicating the volume of flow.

2. A fluid meter embodying a casing for the flow of fluid therethrough, a guide within the casing, a plunger movable in the guide, the guide having an opening for the flow of fluid against the plunger and another opening for the passage of fluid when the plunger is moved, a second casing attached to the aforesaid casing in communication with the guide, the plunger having a stem projecting into the second casing, and indicating means carried by and extending through the second casing having a portion engaging said stem to be operated thereby, the plunger and stem having a bore extending therethrough for the flow of fluid.

3. A fluid meter embodying a casing for the flow of fluid therethrough having a partition and a boss, a cup-shaped guide having its bottom portion secured to the partition at its rim fitting within the boss, a plunger movable in the guide, the bottom portion of the guide having an opening for the flow of fluid against the plunger, the wall of the guide having an opening for the flow of fluid when the plunger is moved, a second casing having a neck attached to the boss in communication with said guide, the plunger having a stem projecting into the second casing, a rock shaft projecting into the second casing, an arm secured to the rock shaft within the second casing bearing on said stem, and an indicating arm secured to said shaft outside of the casing.

4. A fluid meter embodying a casing for the flow of fluid therethrough having a partition and a boss, a cup-shaped guide having its bottom portion secured to the partition at its rim fitting within the boss, a plunger movable in the guide, the bottom portion of the guide having an opening for the flow of fluid against the plunger, the wall of the guide having an opening for the flow of fluid when the plunger is moved, a second casing having a neck attached to the boss in communication with said guide, the plunger having a stem projecting into the second casing, a rock shaft projecting into the second casing, an arm secured to the rock shaft within the second casing bearing on said stem, and an indicating arm secured to said shaft outside of the casing, said plunger and stem having a bore extending therethrough for the passage of the fluid.

5. A fluid meter embodying a casing having an opening therein for the passage of fluid, a plunger operated by the flow of fluid through said opening and having a passage for the fluid to equalize the pressures on the opposite sides of the plunger, and indicating means operated by said plunger.

6. A fluid meter embodying a plunger, a guide for the plunger having an opening for the flow of fluid against the plunger to move it and another opening for the passage of fluid when the plunger is moved, the plunger having a passage for the fluid to equalize the pressures on the opposite sides of the plunger, and indicating means operated by the plunger.

7. A fluid meter embodying a cup-shaped guide, a plunger movable in the guide having a passage for the fluid to equalize the pressures on the opposite sides of the plunger, the bottom portion of the guide having an opening for the flow of fluid against the plunger to move it, the wall of the guide having an opening for the passage of fluid when the plunger is moved, and indicating means operated by the plunger.

8. A fluid meter embodying two casings, one for the flow of fluid therethrough, indicating means carried by the other casing, a guide between the casings for the flow of fluid therethrough, a plunger working in the guide and having a stem projecting into the second mentioned casing to operate the indicating means, the guide having an opening for the flow of fluid against the plunger to move it and another opening for the passage of fluid when the plunger is moved, and the plunger and stem having a bore extending therethrough for the passage of fluid into the second mentioned casing.

In testimony that we claim the foregoing as our own we have hereto affixed our signatures in the presence of two witnesses.

FRANK J. WAGNER.
JOHN G. CARNEY.

Witnesses:
LARMOUR ADAMS,
ARTHUR E. BOLDT.